(12) United States Patent
Fukuda

(10) Patent No.: US 6,742,941 B2
(45) Date of Patent: Jun. 1, 2004

(54) CAMERA

(75) Inventor: Tsuyoshi Fukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/881,375

(22) Filed: Jun. 14, 2001

(65) Prior Publication Data

US 2002/0031347 A1 Mar. 14, 2002

(30) Foreign Application Priority Data

Jun. 21, 2000 (JP) .......................................... 2000-186760

(51) Int. Cl.$^7$ ............................................ G03B 19/12
(52) U.S. Cl. ........................................ 396/358; 396/535
(58) Field of Search ................................ 396/358, 535, 396/529, 541, 6, 536, 429; 348/374, 373

(56) References Cited

U.S. PATENT DOCUMENTS

| | | | | |
|---|---|---|---|---|
| 5,561,458 A | * | 10/1996 | Cronin et al. ............. 348/231.7 |
| 5,576,782 A | * | 11/1996 | Kameyama ..................... 396/6 |
| 5,592,221 A | * | 1/1997 | Mielke ....................... 348/270 |
| 5,628,039 A | * | 5/1997 | Muramatsu et al. ........ 396/296 |
| 5,659,825 A | * | 8/1997 | Dobashi ..................... 396/357 |
| 5,669,017 A | * | 9/1997 | Yamashina et al. ......... 396/502 |
| 5,697,005 A | * | 12/1997 | Kikuchi ...................... 396/535 |
| 5,708,898 A | * | 1/1998 | Manabe et al. ............. 396/535 |
| 5,732,302 A | * | 3/1998 | Yokota ....................... 396/535 |
| 5,739,853 A | * | 4/1998 | Takahashi ................... 348/335 |
| 5,828,919 A | * | 10/1998 | Furuya et al. .............. 396/440 |
| 5,852,752 A | * | 12/1998 | Nakanishi et al. .......... 396/176 |
| 6,058,274 A | * | 5/2000 | Omiya ........................ 396/535 |
| 6,126,334 A | * | 10/2000 | Ohmori ...................... 396/354 |
| 6,205,293 B1 | * | 3/2001 | DiRisio et al. ............. 359/819 |
| 6,208,808 B1 | * | 3/2001 | DiRisio ...................... 359/819 |
| 6,297,909 B1 | * | 10/2001 | Sensui ........................ 359/618 |
| 6,324,348 B1 | * | 11/2001 | Terada ........................ 396/535 |
| 6,359,652 B1 | * | 3/2002 | Takada ........................ 235/439 |
| 6,393,224 B1 | * | 5/2002 | Stern et al. ................. 396/429 |
| 6,453,126 B1 | * | 9/2002 | Abe ............................. 348/64 |

\* cited by examiner

*Primary Examiner*—Russell Adams
*Assistant Examiner*—Michelle Nguyen
(74) *Attorney, Agent, or Firm*—Robin, Blecker & Daley

(57) ABSTRACT

A camera includes a lens holding member for detachably holding a lens device, an image taking device for taking an image formed by the lens device, a front main body member forming a front portion of the main body of the camera, a rear main body member which forms a rear portion of the main body of the camera and is coupled to the front main body member, and a central main body member on which the lens holding member and the image taking device are mounted and which is coupled to at least one of the front and rear main body members.

5 Claims, 4 Drawing Sheets

CAMERA

BACKGROUND OF THE INVENTION

1. Field of the Invention

The present invention relates to a single-lens reflex type digital camera and, more particularly, to a chassis mechanism thereof.

2. Related Background Art

The main body of a single-lens reflex camera using a conventional film is formed by coupling the following components: a cartridge chamber for housing a film cartridge, a spool chamber in which a spool for winding up a film is housed, a main body member formed by a coupling portion that couples the cartridge and spool chambers to form a film rail surface, a coupling member for providing auxiliary strength on the lens mount side of the main body member, and a mirror box to which a mount member having a front end face on which a lens device is detachably mounted is attached, as disclosed in, for example, Japanese Utility model Application Laid-Open No. 62-113341.

The mount member and a mirror mechanism are mounted on the mirror box. The mirror mechanism is retractably inserted in a phototaking optical path and designed to reflect a light beam from a lens and guide it to a finder optical system when it is inserted in the phototaking optical path.

As described above, the camera body is separated into the main body member having the rail surface for positioning a film surface and the mirror box for holding the mount member. Even if the main body member and mirror box are coupled to each other, it is difficult to accurately set a flange back which is the distance from the lens mount surface to the film surface.

For this reason, for example, after the main body member and mirror box are coupled to each other, special operation is required for flange back adjustment, e.g., cutting the rail surface of the main body member to attain an accurate flange back. If the main body member is formed by a mold member, the rail surface cannot be cut. In this case, therefore, the flange back must be adjusted by inserting a washer or the like between the main body member and the mirror box when they are coupled to each other, requiring cumbersome operation. Demands have therefore arisen for an improvement to attain an accurate flange back without cumbersome operation and cost required for the operation.

In a digital camera, since a fast-clock CPU is mounted, much noise is produced. For this reason, the camera body is preferably formed by using a metal that effectively suppress noise instead of a plastic material often used for conventional cameras. If, however, the camera body is to be made of a metal, since it has a complicated shape, aluminum die casting or magnesium alloy forming is required, resulting in an increase in the cost of the camera body. Demands have therefore arisen for a technique of suppressing an increase in cost.

SUMMARY OF THE INVENTION

According to one aspect of this invention, a camera has a central main body member on which a lens holding member and image taking device are mounted, and the central main body member is coupled to at least one of the front main body member forming the front portion of the camera and the rear main body member forming the rear portion of the camera.

With this arrangement, a camera mechanism can be realized, which can accurately set a flange back and is resistant to external static pressure.

According to another aspect of this invention, the front and rear main body members are formed by metal parts to increase the overall strength of the camera.

In addition, the front and rear main body members are rendered conductive to electric ground to effectively prevent noise generated by the electric part from leaking outside the camera.

DETAILED DESCRIPTION OF THE PREFERRED EMBODIMENTS

Figure 1:
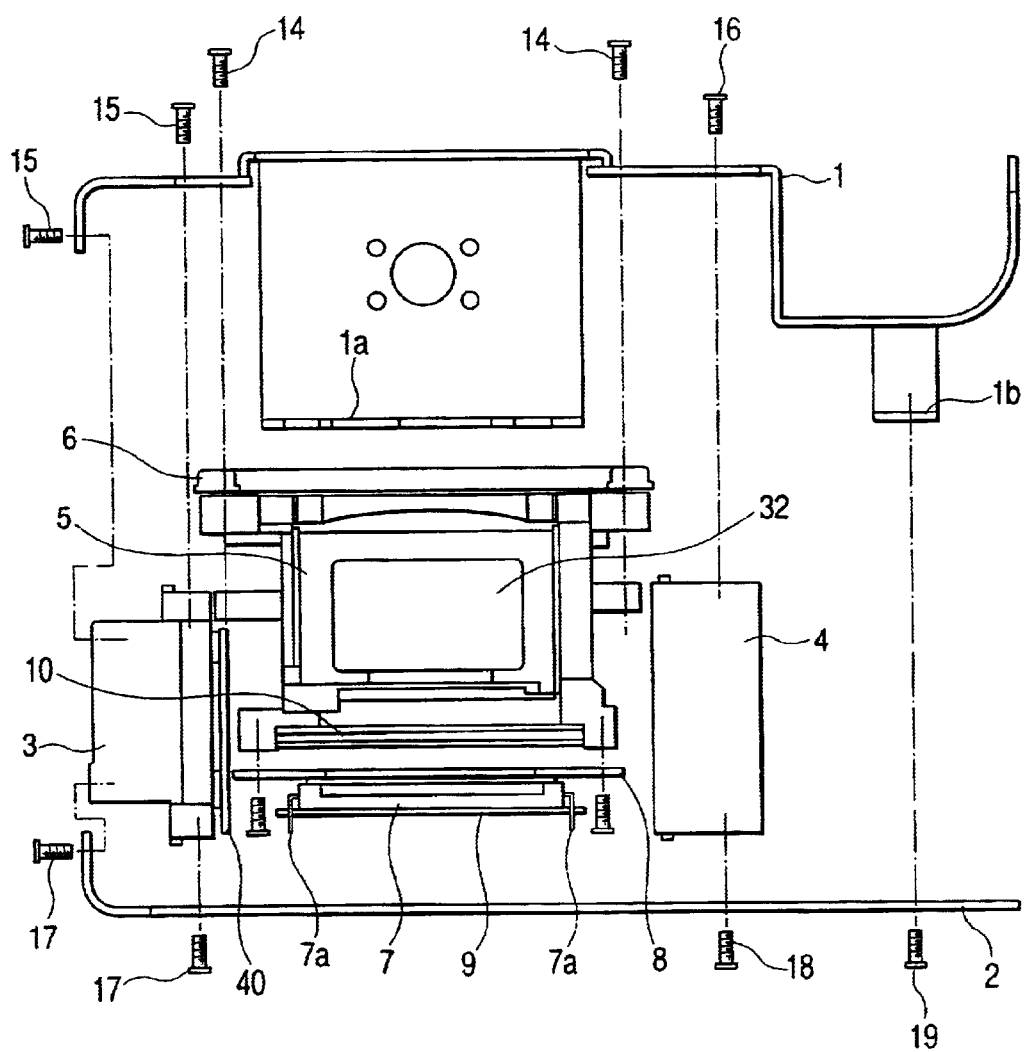
FIG. 1 is an exploded plan view showing the structure of the camera body of a single-lens reflex digital camera according to an embodiment of the present invention.

FIGS. 1 to 4 show the arrangement of a single-lens reflex digital camera according to an embodiment of the present invention. Referring to FIGS. 1 to 4, a front chassis (front main body member) 1 formed by pressing a metal plate is one of members constituting the front portion of the camera body.

A rear chassis (rear main body member) 2 formed by pressing a metal plate is one of members constituting the rear portion of the camera body. Aluminum, iron, stainless steel, or the like may be used as a metal forming these front and rear chassis 1 and 2, and an optimal metal plate thickness may be selected in the range of 0.8 mm to 2 mm in consideration of the relationship between material and strength.

Note that since the front and rear chassis 1 and 2 are formed by pressing, they can be low-cost, high-strength chassis parts. Also, note that the front and rear chassis 1 and 2 may be formed by die casting, thixomodling, or the like.

In addition, the front and rear chassis 1 and 2 are rendered conductive to electric ground.

Coupling chassis (coupling members) 3 and 4 are used to couple the left and right portions of the front and rear chassis 1 and 2. These coupling chassis 3 and 4 are mounted and fixed on the front and rear chassis 1 and 2 with screws 15, 16, 17, and 18. If the coupling chassis 3 and 4 are made of a plastic material, a reduction in cost can be attained. If they are made of a metal material, parts having high strength and high resistance to noise can be obtained.

Bottom surface portions 1a and 1b extend rearward from the lower end portion of the front chassis 1. The front and rear chassis 1 and 2 are integrated into one unit through the coupling chassis 3 and 4. The bottom surface portions 1a and 1b are directly coupled to a lower end portion 2a of the rear chassis 2 with a screw 19 (see FIG. 3).

A central chassis (central main body member) 5 is placed between the coupling chassis 3 and 4 (positions near the coupling chassis 3 and 4) between the front chassis 1 and the rear chassis 2. A lens mount (lens holding member) 6, mirror unit 31 (to be described later), finder optical system (including a focal plate 32) 33, image taking element 7, shutter unit 10, and focus detection unit 35 are mounted on the central chassis 5. This central chassis 5 is fixed on the front chassis 1 at fastening portions 5a and 5b with screws 14.

The lens mount 6 is mounted and fixed on the front end of the central chassis 5. A lens device (not shown) is detachably mounted on the front surface (mount surface) of the lens mount 6 with a bayonet mechanism or the like. A single-lens reflex type image taking system is formed by mounting the lens device on the lens mount 6.

The image taking element 7 is formed by a CCD or the like and designed to photoelectrically convert light received through the lens device mounted on the lens mount 6.

An image taking element holding member 8 on which the image taking element 7 is fixed and held with an adhesive or the like is fastened to the rear end of the central chassis 5 with screws.

A lead 7a for transmitting an electrical output from the image taking element 7 is soldered to a board 9 for transmitting an output from the image taking element 7 to a main circuit board (not shown).

The focal plane shutter 10 limits the amount of light incident from the lens device mounted on the lens mount 6 onto the image taking element 7, and is fixed on the front side of the image taking element 7 at the rear portion of the central chassis 5.

Figure 4:
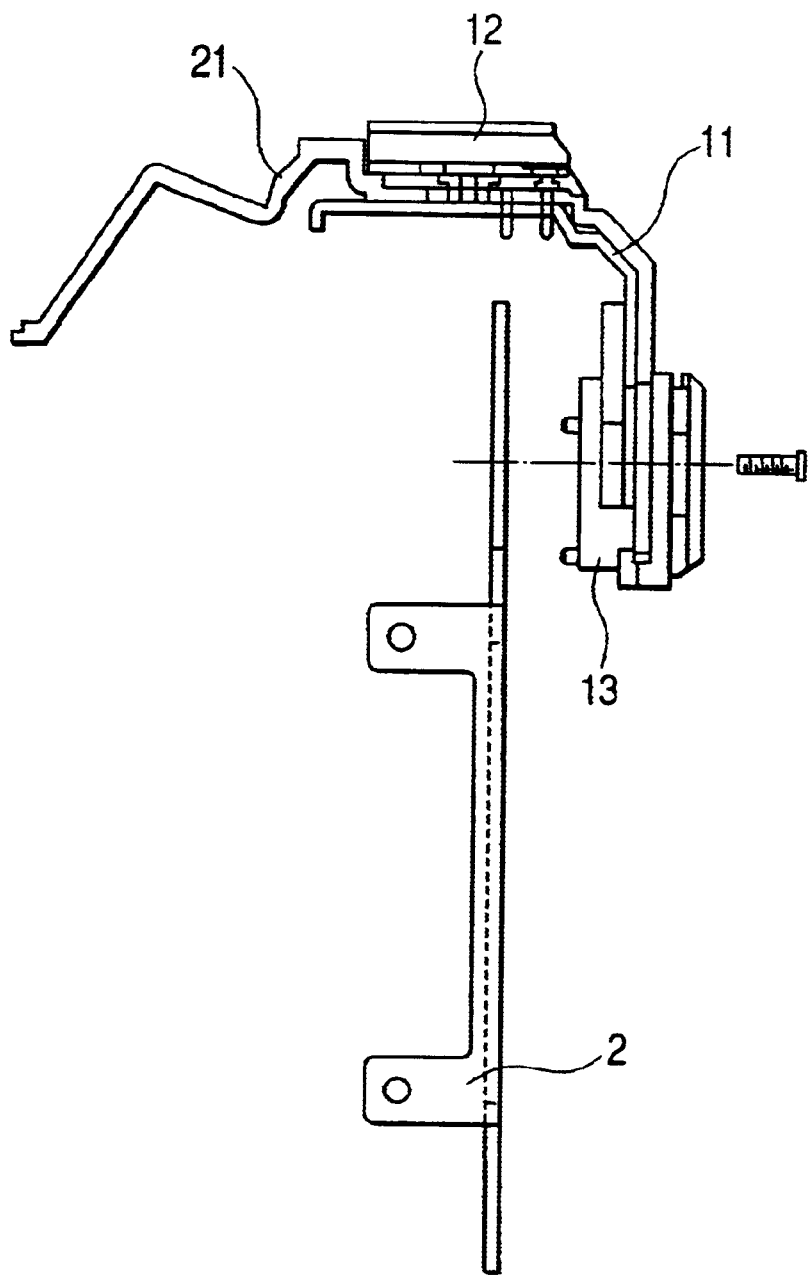
FIG. 4 is an exploded view of the upper portion of the camera body.

Referring to FIG. 4, a reinforcing member 11 made of a metal covers a portion above the finder optical system 33 and the rear surface of a finder eyepiece portion 13 and fixes and holds an upper casing member 21 on which an accessory shoe 12 for detachably mounting an external flash is fixed. The reinforcing member 11 is fixed to the rear chassis 2, together with the upper casing member 21. With this structure, the accessory shoe 12 and finder eyepiece portion 13 are coupled to the rear chassis 2 through the reinforcing member 11 to increase the strength of portions around the accessory shoe 12 and finder eyepiece portion 13. In addition, since the reinforcing member 11 is grounded through the rear chassis 2, a reduction in noise leakage from the upper portion of the camera can be achieved.

Note that the finder eyepiece portion 13 holds an eyepiece which is one of the constituent elements of the finder optical system 33, and can detachably hold an accessory (e.g., an eyepiece) for the finder.

The mirror unit 31 is comprised of a main mirror 31a which is retractable (down/up) with respect to a position on the front side of the shutter unit 10 in the image taking optical path, a sub-mirror 31b which is placed behind the main mirror 31a and can be extended/folded with respect to the main mirror 31a, and a driving mechanism (not shown) for driving the main mirror 31a and sub-mirror 31b.

The main mirror 31a reflects a light beam from the lens device mounted on the lens mount 6 toward the finder optical system 33 while it is placed in the image taking optical path (mirror down). As this main mirror 31a, a half mirror that partly transmits a light beam from the lens device is used. The transmitted light beam is then reflected by the sub-mirror 31b, which is extended with respect to the main mirror 31a, toward a focus detection unit 35.

While the main mirror 31a is retracted from the image taking optical path (mirror up), a light beam from the lens device directly propagates toward the shutter unit 10 and image taking element 7. At this time, the sub-mirror 31b is folded with respect to the main mirror 31a.

The focal plate 32 is one of the constituent elements of the finder optical system 33. The object light beam reflected by the mirror unit 31 comes into a focus on the focal plate 32. This allows a user to observe an object through the finder.

A pentagonal prism 34 is one of the constituent elements of the finder optical system 33 and designed to guide the object image formed on the focal plate 32 to the finder eyepiece portion 13.

An electric component part 40 is placed between the coupling chassis 3 and the central chassis 5 (fixed and held on the coupling chassis 3). Note that other electric component parts are arranged in the gaps formed between the respective coupling chassis 1 to 3.

Figure 2:
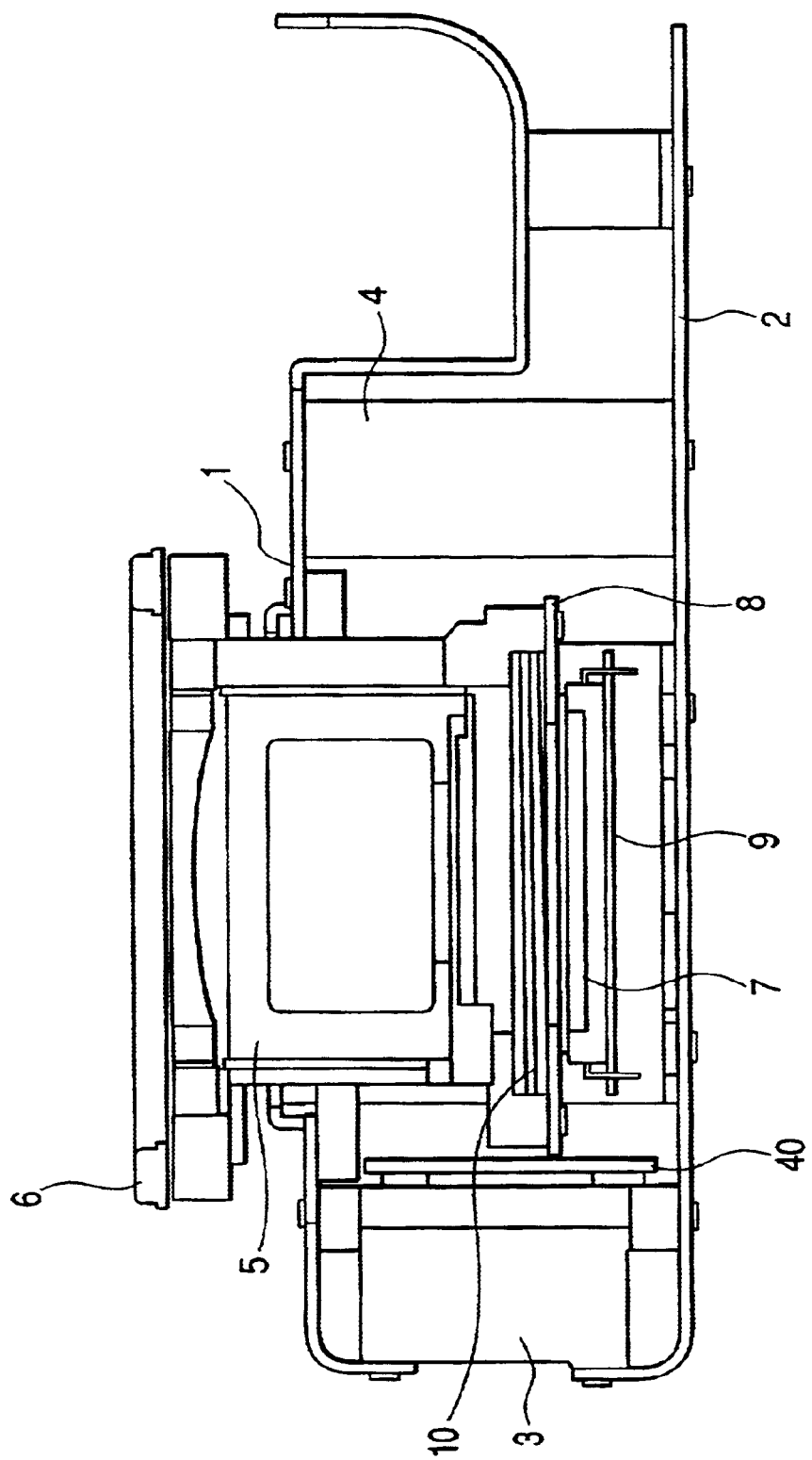
FIG. 2 is a plan view showing a state where the camera body is completely assembled.
Figure 3:
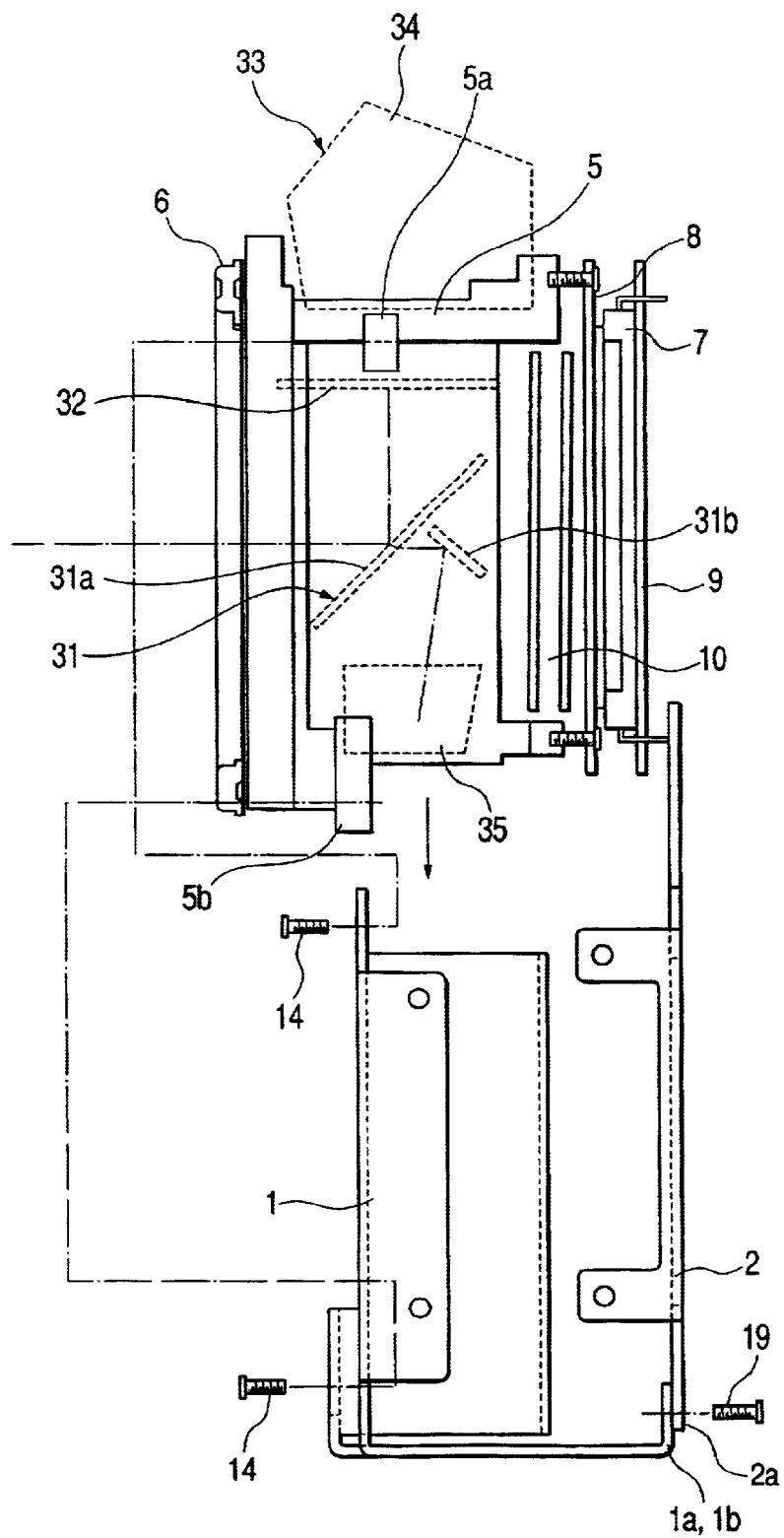
FIG. 3 is an exploded side view showing the structure of the camera body.

When the camera body having the above structure is completely assembled as shown in FIG. 2, the front and rear chassis 1 and 2 are firmly coupled with screws through the coupling chassis 3 and 4 on the left and right sides of the central chassis 5, and the lower end portions (the bottom portion 1a and lower end portion 2a) of the respective chassis are also firmly coupled to each other with screws. That is, the front and rear chassis 1 and 2 and coupling chassis 3 and 4 are firmly integrated into one box-shaped unit surrounding the central chassis 5. The central chassis 5 is also firmly coupled to the front chassis 1 of the chassis structure integrated in the form of a box with screws. This makes it possible to realize a chassis structure having very high strength as a whole.

In addition, the front and rear chassis 1 and 2 and reinforcing member 11 are made of a metal, and all these metal members are rendered conductive to electric ground. This can effectively prevent noise generated by the electric parts (40 and the like) within the chassis from leaking outside the camera.

If the coupling chassis 3 and 4 are made of a metal material, the strength of the structure and noise reducing effect can be further improved.

In addition, both the lens mount 6 and the image taking element 7 which determine the flange back are attached to the central chassis 5. Even if, therefore, external force is applied to the lens device mounted on the lens mount 6 and transferred to the camera body side, the flange back does not easily change. That is, the flange back is resistant to external static pressure.

Since the central chassis 5 is coupled to the front chassis 1 located near the lens device, the central chassis 5 is not easily influenced by force from the lens device as compared with a case where the central chassis 5 is coupled to the rear chassis 2.

In addition to the lens mount 6 and image taking element 7, all the mirror unit 31, the finder optical system 33 including the focal plate 32, and the focus detection unit 35 are fixed on the central chassis 5. In addition to the flange back, the distances from the lens mount 6 to the focal plate 32 of the finder optical system 33 and from the lens mount 6 to the focus detection unit 35 are also determined by the relationship with the central chassis 5. For this reason, even if external force is applied to the lens device mounted on the lens mount 6 and transferred to the camera body side, the relationship between the above three distances is hardly influenced and does not change.

With the above structure, a camera body which is not hardly influenced by external static pressure and very resistant to static pressure can be realized.

In the above embodiment, the central chassis 5 is coupled to only the front chassis 1. However, the central chassis 5 may be coupled to only the rear chassis 2 or coupled to both the front and rear chassis 1 and 2.

In the above embodiment, the reinforcing member 11 is mounted on the rear chassis 2. However, the reinforcing member 11 may be mounted on the front chassis 1 or mounted across the two chassis 1 and 2.

As has been described above, according to this embodiment, even if external force is applied to the lens device mounted on the lens holding member, and deforming force acts on the camera body, since both the lens holding member and the image taking device, which determine the flange back, are mounted on the central main body member, a change in flange back can be prevented.

Note that if the central main body member is fixed to only the front main body member, of the front and rear main body members, which is located closer to the lens device, the influence of external force, applied to the lens device, on the camera body can be further reduced.

In addition, the use of a coupling member for coupling the front and rear main body members can increase the overall strength of the camera body.

Furthermore, if the finder optical device (including the focal plate) and the mirror unit for reflecting a light beam from the lens device toward the finder optical system are mounted on the central main body member or the focus detection device for performing focus detection by using a light beam from the mirror unit is also mounted on the central main body member, a change in distance between the above two or three components due to external force applied to the lens device can be prevented.

Assume that the front and rear main body members are formed by metal parts and rendered conductive to electric ground. In this case, when an electric part is placed between these main body members, noise generated by the electric part and leaking outside the camera can be reduced.

Furthermore, if a reinforcing metal member is mounted on the front or rear main body member and used to support the casing member on which an accessory mount portion on which an electronic flash and other accessories can be detachably mounted is fixed, the strength of a portion around the accessory mount portion can be increased, and a noise reducing effect can be obtained.

What is claimed is:

1. A camera comprising:
   a front chassis which forms a front portion of a main body of said camera;
   a rear chassis which forms a rear portion of the main body of said camera and is coupled to said front chassis;
   a lens mount;
   an image taking device designed to photoelectrically convert light received and being disposed between said front chassis and said rear chassis;
   a mirror unit disposed between said lens mount and said image taking device,
   a central main body member on which said lens mount and said image taking device are mounted and which is coupled to at least one of said front and rear chassis, and
   wherein said central main body member is fixed to only said front chassis of said front and rear chassis.

2. A camera comprising:
   a front chassis which forms a front portion of a main body of said camera;
   a rear chassis which forms a rear portion of the main body of said camera and is coupled to said front chassis;
   a lens mount;
   an image taking device designed to photoelectrically convert light received and being disposed between said front chassis and said rear chassis;
   a mirror unit disposed between said lens mount and said image taking device;
   a central main body member on which said lens mount and said image taking device are mounted and which is coupled to at least one of said front and rear chassis, and
   wherein said front and rear chassis comprise metal parts.

3. A camera according to claim 2, wherein said front and rear chassis are formed by pressing.

4. A camera according to claim 2, further comprising an electric component part placed between said front and rear chassis, said front and rear chassis being rendered conductive to electric ground.

5. A camera comprising:
   a front chassis which forms a front portion of a main body of said camera;
   a rear chassis which forms a rear portion of the main body of said camera and is coupled to said front chassis;
   a lens mount;
   an image taking device designed to photoelectrically convert light received and being disposed between said front chassis and said rear chassis;
   a mirror unit disposed between said lens mount and said image taking device;
   a central main body member on which said lens mount and said image taking device are mounted and which is coupled to at least one of said front and rear chassis, and
   a casing member on which an accessory mount portion on which an electronic flash and other accessories can be detachably mounted is fixed,
   said casing member bring supported by a reinforcing metal member mounted on at least one of said front and rear chassis.

* * * * *